United States Patent [19]

Huber

[11] Patent Number: 4,480,875
[45] Date of Patent: Nov. 6, 1984

[54] ACCELERATOR FOR CONTROL VALVES, ESPECIALLY FOR TRIPLE PRESSURE CONTROL VALVES IN PNEUMATIC BRAKE SYSTEMS OR RAIL VEHICLES

[75] Inventor: Johann Huber, Munich, Fed. Rep. of Germany

[73] Assignee: Knorr-Bremse GmbH, Munich, Fed. Rep. of Germany

[21] Appl. No.: 396,505

[22] Filed: Jul. 8, 1982

[30] Foreign Application Priority Data

Jul. 14, 1981 [DE] Fed. Rep. of Germany ....... 3127774

[51] Int. Cl.³ .............................................. B60T 17/04
[52] U.S. Cl. .......................................... 303/38; 303/82
[58] Field of Search ....................... 303/33, 37, 38, 39, 303/81, 82, 83

[56] References Cited

U.S. PATENT DOCUMENTS 4,073,544  2/1978  Hart .................................. 303/38 X
4,145,090  3/1979  Hart ...................................... 303/37
4,206,949  6/1980  Rathband et al. ..................... 303/38

FOREIGN PATENT DOCUMENTS 967165  10/1957  Fed. Rep. of Germany .

Primary Examiner—Duane A. Reger
Attorney, Agent, or Firm—Pollock, Vande Sande & Priddy

[57] ABSTRACT

An accelerator for control valves, particularly for triple pressure control valves (3) of pneumatic brake systems of rail vehicles, having a pick-up accelerator (30) and a transfer chamber (40) as well as a service brake accelerator (52), the service brake accelerator (52) having a reference pressure chamber (55) which is connected to the transfer chamber (40) of the pick-up accelerator, the transfer chamber having a bleeder nozzle which is not open at all times. As a result, the service brake accelerator (52) is activated only during braking operations, while the reference pressure chamber (55) is protected from filling strokes, the volumes which are in continuous connection with the air main (1) are reduced, and the air consumption is lowered, especially during brake release operations. Service brake accelerators (52) of any desired construction may be used, especially, however, service brake accelerators which, during pressure reductions within the air main (1), draw off pulsating pressurized air from the latter.

8 Claims, 3 Drawing Figures

ACCELERATOR FOR CONTROL VALVES, ESPECIALLY FOR TRIPLE PRESSURE CONTROL VALVES IN PNEUMATIC BRAKE SYSTEMS OR RAIL VEHICLES

SUMMARY OF THE INVENTION

The invention relates to an accelerator for control valves, especially for triple pressure control valves in pneumatic brake systems of rail vehicles, the said control valves having a pick-up accelerator with a transfer chamber lowering the pressure within the air main at the start of the braking operation.

BACKGROUND OF THE INVENTION

An accelerator of this type, or, respectively, a triple pressure control valve equipped with such an accelerator, is known from German Published Application No. 26 51 377. According to that disclosure document, the pick-up accelerator is equipped with the intake and the shut-off valves only, the discharge valve being omitted. According to German Pat. No. 967,165, however, it is also known to provide a pick-up accelerator integrated into a triple pressure control valve with a discharge valve in addition to the intake valve.

According to German Published Application No. 26 51 377, the accelerator is structurally combined with the pick-up accelerator, in which the piston element which can be affected by the air main pressure against the reference chamber pressure, acts upon the shut-off valve, so that the shut-off valve simultaneously represents the valve arrangement coupled with the piston element. This prior art accelerator has the disadvantage that the discharge valve or, respectively, the valve system is coupled not only to the piston element but also to a small piston which is influenced by a brake pressure into the closing direction. The valve system therefore is precharged into the closing direction dependent on the braking level, so that differential pressures whose level is dependent on the respective prevailing braking level must act upon the piston element in order to be able to re-open the valve system during a braking operation. The prior art accelerator in its function hence manifests an undesirable dependency on the prevailing braking level.

The arrangement according to the aforementioned German Pat. No. 967,165 has only a pick-up accelerator but no piston element coupled with a valve system controlling an air outlet from the air main to atmosphere, said piston element being under the influence of pressure from the air main, acting against a reference pressure.

For an accelerator to be arranged separately from a control valve and, respectively, a triple pressure control valve having a pick-up accelerator, it is known to provide a piston element charged,on the one hand, by the pressure in one of the line chambers connected with the air main and, on the other hand, charged by the pressure in a reference pressure chamber, and being coupled with a valve system comprising an intake and discharge valve for the reference pressure chambers and with a discharge valve for the air main. The arrangement is so designed that the accelerator, when responding, first closes the intake valve to the reference pressure chamber by means of a supply of pressurized air, whereupon it opens the discharge valve from the reference pressure chamber by way of a choke connection to atmosphere, and only then opens the discharge valve for the air main. An accelerator of this type is known from German Pat. No. 969,085. As previously mentioned, these accelerators constitute additional components of the control valve and therefore demand additional investments in components and circuitry; these accelerators present a problem by the very difficult monitoring of the pressure in the reference pressure chamber, inasmuch as the said reference pressure chamber must, on the one hand, be protected from overcharges caused by filling strokes fed into the air main or the pressure source, respectively, while, during braking operations they must follow precisely the pressure decay in the air main, and pressure fluctuations in the pressure source influenced by factors thus may have an interfering effect. Accelerators of this kind, therefore, were used until now essentially only as so-called rapid acting brake accelerators responding only to particularly rapid pressure decays in the pressure main, such as would occur during emergency braking to assure proper functioning of such emergency braking.

Other so-called service brake accelerators are known which respond at the start and during the step-by-step increase of service braking operations and which, for the duration of the pressure decay within the air main, draw off pressurized air from the latter. These service brake accelerators often have an oscillating mode of operation, which means that they draw pulsating air from the air main. All of these service brake accelerators have a piston element which is charged by the pressure in a line chamber connected to the air main, against the pressure within a reference pressure chamber, the said reference pressure chamber in each case being connected with the air main by way of a nozzle. All of these accelerators, which are designed as components to be arranged separately from the control valve, have the basic disadvantage that the reference pressure chambers have no sure protection against overcharges such as may occur, for instance, during filling strokes, so that an undesirable response is possible, particularly during the decay of filling strokes. While it is possible to provide protective devices against filling stroke effects known from other arrangements, these devices would present an unbearable economic burden for the construction of accelerators of this type. An additional disadvantage of the aforementioned service brake accelerators can be seen in the nozzle connection of the reference pressure chamber with the air main: during the brake application, compressed air may flow from the reference pressure chamber into the air main, hindering the pressure decay in the air main, while during the brake release operations the transfer chambers may suck from the air main compressed air urgently needed at other locations, contributing in a manner undesirable to their recharging. Service brake accelerators of the aforedescribed kind are known, e.g., from German Published Application No. 29 46 657 and U.S. Pats. Nos. 4,073,544 and 4,145,090.

It is also known, from U.S. Pat. No. 4,206,949, to couple a service brake accelerator with pulsating operation with a control valve regarding its reference pressure chamber, in such a way that the reference pressure chamber of the accelerator is filled from a reference pressure chamber already provided within the control valve, i.e., that it is connected with this already available reference pressure chamber. The known accelerators of this type, however, during their operation influence the pressure within the reference pressure chamber of the control valve, and may thereby influence the operation of the control valve in an undesirable manner. As a minimum, coordination of the control valve and the service brake accelerator is necessary. Consequently, the aforementioned service brake accelerators cannot be simply combined with previously available control valves, and thus are unsuited for a retrofitting into existing pneumatic brake systems.

OBJECT OF THE INVENTION

The object of the invention is an accelerator of the type described which, with at minimum cost, provides a pressure course for the reference pressure chamber assuring its safe functioning, which provides, in particular, overcharge protection and, at the initiation of response, a pressure level which is adapted to that of the air main, and in which the reference pressure chamber during brake application and release does not exert any undesirable influences on the pressure within the air main. In particular, the brake accelerator should not use unnecessary compressed air. In addition, the brake accelerator should be well suited for retrofitting existing pneumatic brake systems, and particularly for a combination with triple-pressure control valves with pick-up accelerators within such pneumatic brake systems.

While, on the one hand, the connection of the reference pressure chamber assigned to the piston element to the transfer chamber of the pick-up accelerator, instead of to the occasionally provided bleeder nozzle, does not in practice alter the functioning of the control valve, it does assure that the reference pressure chamber is acted upon by the respective air pressure obtaining within the air main only during brake applications, namely at the start of the braking operation after the response of the pick-up accelerator, and with an air volume which must be drawn from the air main at any rate. This prevents an overcharge of the reference pressure chamber; because the shut-off valve closes after the response of the control valve, undesirable pressurized air cannot be fed back into the air main by the reference pressure chamber, during brake release no undesirable pressurized air is drawn from the air main into the reference pressure chamber, and an undesirable jump of the accelerator in the brake release position, particularly during the decay period of the filling strokes, is impossible. It should be emphasized that the valve system to be controlled by the piston element may be of any desired conventional or novel design.

Advantageous embodiments of the accelerator according to the invention improve the bleeding of the transfer chamber and of the reference pressure chamber coupled with it, at the end of brake release operations, thereby promoting the renewed readiness of the pick-up accelerator and of the valve system coupled with the piston element, and thus of the entire service brake accelerating device. A further embodiment results in an additional improvement of the pressure course for the reference pressure chamber, improving its pressure so that its pressure level can be better adjusted to that of the air main. In addition, the latter embodiment assures the maintenance of a suitable reference chamber pressure during extended braking periods, even in the presence of possible leakage from the reference pressure chamber, or from valve and conduit elements connected therewith.

BRIEF INTRODUCTION TO THE DRAWINGS

In order that the invention may be more clearly understood, reference will now be made to the accompanying drawings, wherein several embodiments of the invention are shown for purposes of illustration, and wherein:

FIG. 1 is a schematic illustation of a triple pressure control valve combined with the accelerator; and FIGS. 2 and 3 are schematic illustations of preferred embodiments of the valve system.

DESCRIPTION OF PREFERRED EMBODIMENT

Figure 1:
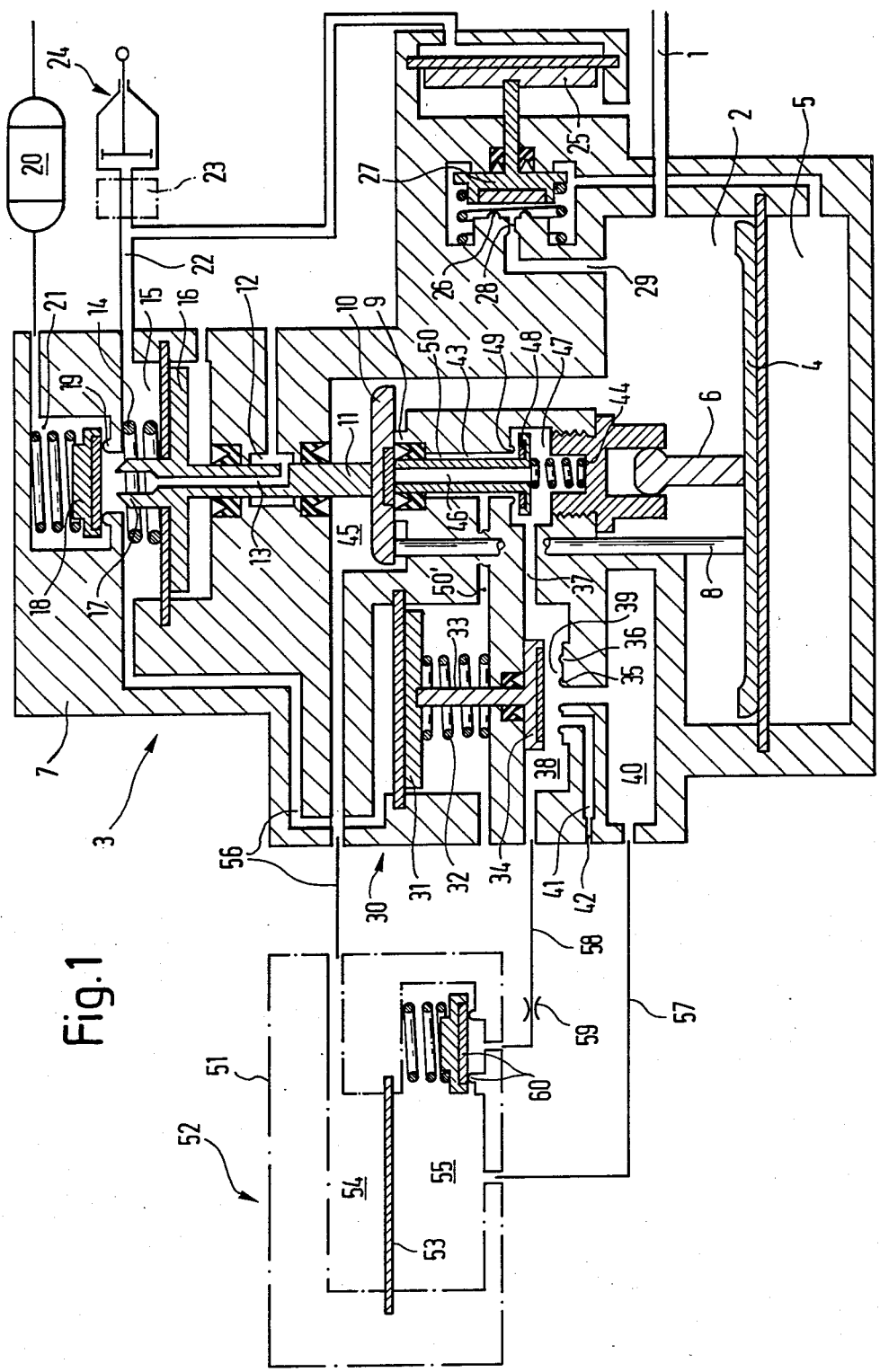

The pneumatic brake system according to FIG. 1 has a triple pressure control valve 3 connected to an air main 1 with its control chamber 2. The control chamber 2 is separated from a constant pressure chamber 5 by means of a control piston 4. The said control piston 4, which is guided within the housing 7 by means of a tappet 6, is coupled by way of an additional tappet 8, guided within the housing 7, with a valve disk 10 which comes to rest against a stop 9. The valve disk is connected to a valve tappet 11 which is sealed and displaceably guided within the housing 7, has a longitudinal bore 13 which is perpetually connected to atmosphere by way of an opening 12, said tappet bearing a piston 16 which on one side is pressurized by atmospheric pressure and on the other side is acted upon by a spring 14 and the brake pressure in a chamber 15, ending in a valve seat 17 surronding the frontal opening of the longitudinal bore 13. In the release position of the triple pressure control valve 3, valve seat 17 is faced, at a distance, by a double valve seal 18 which, in combination with a valve seat 19 mounted within the housing, forms a valve 18, 19 which controls the air passage into chamber 15 from a space 21, which in turn is connected with an air storage tank 20.

Chamber 15 is connected, by way of a line 22 and, if necessary, a relay valve 23, with a brake cylinder 24. Air storage tank 20 is supplied in a conventional manner (not shown) with pressurized air from air main 1.

Housing 7 further contains a piston 25 which is biased against atmospheric pressure in the closing direction of a fixed valve seat 26 and a valve seal 27 spring loaded into the opening direction, by the pressure in chamber 15. Valve 26, 27 is arranged within a connection 29 between the control chamber 2 and constant pressure chamber 5, said connection having a nozzle 28.

A pick-up accelerator 30 contained within housing 7 comprises a piston 31 which, on the one hand, is affected by the braking pressure within chamber 15 and, on the other hand, by atmospheric pressure and the force of a spring 32. Piston 31 is connected, by way of a tappet 33 which is sealed and guided within the housing 7, with a valve seal 34, which, together with two concentrically arranged valve seats 35, 36, fixed to the housing, form a double valve 34, 35, 36 which opens in the same direction and also nearly simultaneously. Valve seal 34 is located within a space 38 connected with one duct section 37, the valve passage formed by the larger valve seat 36 and the valve seal 34 is located between space 38 and an annular space 39 bordered by the two valve seats 35 and 36, and the smaller valve seat 35 forms a valve passage together with valve seal 34, said passage leading from annular space 39 to a transfer chamber 40 connected with the interior space of valve seat 35. From annular space 39, a duct 41 leads to atmosphere by way of a nozzle 42.

A control sleeve 43, sealed and displaceably held within housing 7 coaxially with valve tappet 11, is an additional part of the pick-up accelerator. The upper end of the control sleeve 43, which is biased against the valve disk 10 by means of a spring 44, forms in conjunction with valve disk 10, an intake valve 10, 43 controlling the air passage from a space 45 connected with the control chamber 2 to the interior space 46 of the control sleeve 43 as well as to a space 47 within the housing 7. A flange 48 of control sleeve 43 located within space 47, together with a valve seat 49 on the housing, surrounding the opening of an annular space 50 about the control sleeve 43 between control sleeve 43 and housing 7, forms a discharge valve 48, 49.

Duct section 37 opens into space 47. Annular space 50 is connected to atmosphere by way of a bleeder duct 50'.

To this extent, the triple pressure control valve 3 essentially corresponds to that described in German Published Application No. 26 51 377, the only distinctions being the slight functional differences, to be explained later, arising from the omission of the known bleeding device for transfer chamber 40 and the design of the shut-off valve between duct section 37 and transfer chamber 40 as a double valve 34, 35, 36, and the omission of the known second activating piston for the said shut-off valve with the addition of discharge valve 48, 49. The structure and the operation of triple pressure control valve 3 also largely correspond to the triple pressure control valve according to German Pat. No. 967,165, in which only the simple shut-off valve is different from the double valve 34, 35, 36, and the bleeding of the transfer-chamber is different from triple pressure control valve 3. The basic function of triple pressure control valve 3 corresponds to the state of the art, is well known and requires no further description.

The pneumatic brake system also comprises a service brake accelerator 52, indicated by a dash-dot line 51, which may be of the type disclosed in German Published Application No. 29 46 657 or in U.S. Pat. Nos. 4,073,544 or 4,145,090. Particularly suitable embodiments of service brake accelerator 52 will be discussed hereinbelow in connection with FIGS. 2 and 3.

Service brake accelerator 52 is preferably designed as an apparatus which is flange-mounted to housing 7. In FIG. 1, it is shown somewhat removed from the housing 7 merely to show the components more clearly.

Service brake accelerator 52 has a piston element 53 which is charged by the pressure in a line chamber 54 on the one hand, and the reference pressure in a reference pressure chamber 55 on the other. Line chamber 54 has the same pressure as the air main pressure, said pressure preferably being introduced from space 45 by way of a duct 56, as shown in FIG. 1. Reference pressure chamber 55 is in connection with transfer chamber 40 by way of a duct 57; in the case of already existing triple pressure control valves of conventional design, duct 57 preferably is connected to the transfer chamber 40 instead of the bleeding device provided in the said transfer chamber. From duct section 37 or space 38, respectively, a duct 58 leads to reference pressure chamber 55 by way of a nozzle 59 and a check valve 60. While FIG. 1 shows only check valve 60 as integrated into the service brake accelerator 52, both control organs arranged in series within duct 58 could also be arranged within service brake accelerator 52, duct 58 or housing 7.

The valve arrangement belonging to service brake accelerator 52 controlling an outlet from line chamber 54 to atmosphere is not shown in FIG. 1 inasmuch as it may be designed in various ways, as previously mentioned.

With the brake released and ready for operation, all parts are in the position as shown in FIG. 1, whereby by way of duct 56, line chamber 54 is pressurized with the air main pressure at control pressure elevation, reference pressure chamber 55 by way of duct 57 and transfer chamber 40 as well as opened doubled valve 34, 35, 36 and nozzle 42 having been bled. Discharge valve 48, 49 is also open, so that duct 58 and space 38, in addition to opened double valve 34, 35, 36, are connected with atmosphere also by way of duct section 37, space 47, annular space 50 and its bleeding duct 50'.

At the start of a braking operation caused by the pressure reduction in the air main 1, control piston 4 lifts, causing discharge valve 48, 49 to close and intake valve 10, 43 to open. From space 45 air from the air main then flows through control sleeve 43 into space 47, passing through duct section 37 and into space 38. From space 38, pressurized air on the one hand reaches atmosphere by way of duct 41 and nozzle 42 and, on the other hand, it reaches transfer chamber 40 by way of interior valve passage 34, 35; this double drawing-off of air causes the initial pressure drop within air main 1 to be augmented to such an extent that triple pressure control valve 3 will respond with absolutely certainty, i.e., that its control piston 4 will lift until the injection of pressurized air from space 21 into the chamber 15 through opening valve 18, 19. Meanwhile, pressurized air from transfer chamber 40 reaches reference pressure chamber 55 through duct 57 and raises its pressure to a level at least approximating the prevailing air main pressure, causing service brake accelerator 52 to be activated. The rising brake pressure in chamber 15 closes valve 26, 27 by way of piston 25, closing off constant pressure chamber 5, and also closes double valve 34, 35, 36 by way of piston 31, causing space 38, duct 41 and transfer chamber 40 to be separated from each other. If this has not already occurred, reference pressure chamber 55 is now lifted to the prevailing level of the air main pressure (the latter having already dropped below the control pressure level) by way of space 38, duct 58, nozzle 59 and check valve 60. Simultaneously, the drawing-off of air by means of pickup accelerator 30 into transfer chamber 40, as well as by duct 41 towards atmosphere, is terminated. During an additional lowering of the pressure in air main 1, the pressure in line chamber 54 drops correspondingly, while the pressure in reference pressure chamber chamber 55 initially is maintained and mostly acts upon piston element 53. Service brake accelerator 52 therefore is activated in the conventional manner, preferably drawing off pulsating pressurized air from line chamber 45 to atmosphere while simultaneously lowering the pressure within reference pressure chamber 55 and thus also within transfer chamber 40 for the purpose of its stabilization. At the conclusion of the pressure reduction initiated in air main 1 and thus in line chamber 54, service brake accelerator 52 also, in a conventional manner, ceases to draw off air from line chamber 54. Triple pressure control valve 3 meanwhile controls a brake pressure level in the brake cylinder 24 which corresponds to the pressure reduction within the air main 1, and then, during a certain lowering of control piston 4, reaches its final position in which double valve seal 18 abuts against valve seat 19 as well as against valve seat 17. In this final position, intake valve 10, 43 is still open and discharge valve 48, 49 remains closed.

During augmentation of the selected braking level by additional pressure reduction in air main 1, the above described processes are repeated accordingly, service brake accelerator 52 resuming its activity and temporarily drawing off pressurized air from line chamber 54 and venting it to atmosphere.

During subsequent release of the brakes, control piston 4 descends further and brake cylinder 24 is bled to atmosphere by way of valve seat 17, lowering from double valve seal 18, and longitudinal bore 13. As soon as the complete release position has been reached, valve disk 10 seats upon control sleeve 43 and pushes it downward, opening discharge valve 48, 49. Space 38 is bled by this operation. If the pressure falls below a residual pressure within chamber 15, valve 26, 27 as well as double valve 34, 35 36 open, causing reference pressure chamber 55 and transfer chamber 40 to be bled through duct 41 and nozzle 42 as well as parallel thereto by way of discharge valve 48, 49.

It is obvious that overcharges in air main 1, such as may be caused, for instance, by filling strokes, can at most reach line chamber 54 of the service brake accelerator, where, however, they are entirely harmless. Intake valve 10, 43, which would be closed in cases of such overcharges, will prevent the latter from reaching reference pressure chamber 55, in which case the subsequent decay of the overcharge could produce an unintended start of the service brake accelerator. It is further evident that in the release position reference pressure chamber 55 is without pressure, and that only at the start of the braking operation and after the response of pick-up accelerator 30 it is filled with pressurized air to the required extent for the functioning of the service brake accelerator, said air being drawn off from the air main by the pick-up accelerator. During the subsequent release operation, service brake accelerator 52 does not require any pressurized air for the recharging of reference pressure chamber 55, the pressure of which had been reduced; the brake release operation is facilitated by this savings of pressurized air. It is important for the braking operation that, in contrast to prior art service brake accelerators, no pressurized air may flow from reference pressure chamber 55 to air main 1, which could make the braking process more difficult. Service brake accelerator 52, therefore, not only avoids any unnecessary consumption of compressed air, but also obviates any function, or partial function, which could impair the braking as well as the brake release operations.

Figure 2:
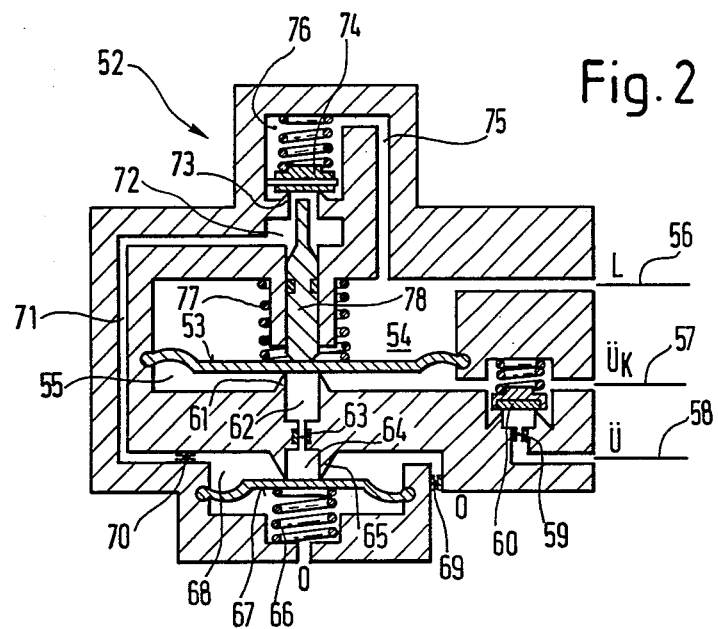

FIG. 2 shows the preferred design of service brake accelerator 52. Ducts 56, 57 and 58, nozzle 59, check valve 60, piston element 53 designed as a diaphragm, line chamber 54 as well as reference pressure chamber 55 are shown. In the illustrated rest position, piston element 53 on its reference pressure chamber side rests against a valve seat 61 which is rigidly connected to the housing, the interior space 62 of said valve seat 61 being connected by way of a nozzle 63 with the interior space 64 of a further valve seat 65. A diaphragm 67 is pressed against valve seat 65 by a spring 66. The space 68 surrounding valve seat 65 and bordered by diaphragm 67 is connected to atmosphere through a nozzle 69 and to a duct 71 by means of an additional nozzle 70. This duct 71 leads to a space 72 which is separated from a space 76 by means of a valve 73, 74 formed by a housing-mounted valve seat 73 and a spring-loaded sealing plate 74, space 76 being connected to line chamber 54 through a duct 75. A spring 77, arranged within the line chamber 54, biases piston element 53 in the direction of and against valve seat 61, and a tappet 78 which rests against piston element 53 passes through line chamber 54, is guided in a sealed arrangement within the housing and ends in space 72, a short distance from sealing plate 74.

Whenever the brake is released and under pressure, service brake accelerator 52 assumes the position shown in FIG. 2. Line chamber 54 and space 76 are under pressure, while all other areas of the service brake accelerator are vented. At the start of the braking operation, and as previously described, reference pressure chamber 55 is pressurized with the prevailing air main pressure, essentially by way of duct 57, and also by way of duct 58, nozzle 59 and check valve 60. As soon as the air main pressure, and thereby the pressure within line chamber 54, is somewhat reduced, piston element 53 is mostly affected by the reference pressure obtaining within reference pressure chamber 55, and lifts from valve seat 61, permitting the reference pressure to enter the interior space of valve seat 65 by way of nozzle 63. Piston element 53 by means of tappet 78 then lifts sealing plate 74 from valve seat 73, opening valve 73, 74, and permitting pressurized air from line chamber 54 to flow into space 68 through nozzle 70, and a portion of this air flowing from this space to atmosphere through nozzle 69. At the same time, intermediate pressure builds up within space 68 which soon pushes diaphragm 67 downward against the force of spring 66, causing the interior space 64 to be connected with space 68 and permitting pressurized air to flow from reference pressure chamber 55 through nozzle 63, as well as through space 68 and nozzle 69, out to atmosphere. For this purpose, the nozzles are so dimensioned that the thus initiated pressure drop in reference pressure chamber 55 is faster than the pressure drop in line chamber 54; thus, as soon as the pressure in reference pressure chamber 55 falls below the pressure obtaining within line chamber 54, piston element 53 descends while closing valve 73, 74. The thus interrupted feeding of air main pressure through valve 73, 74 into space 68 is replaced by the feeding of pressurized air from reference pressure chamber 55 through nozzle 63 into space 68, so that space 68 remains under a certain pressure and, consequently, diaphragm 67 remains lifted off valve seat 65. The thereby effected additional pressure reduction within reference pressure chamber 55 results in an additional lowering of piston element 53, until the latter seats against the valve seat 61, interrupting the air flow from reference pressure chamber 55 into space 68. The pressure within space 68 is then reduced towards atmosphere by way of nozzle 69, and spring 66 can push diaphragm 67 upwardly so that it comes to rest against valve seat 65 and separates interior space 64 from space 68. This concludes one drawing-off cycle. Should the air main pressure continue to sink, the respective drawing-off cycles are repeated, pressurized air from line chamber 54 and thus from the air main being bled each time to atmosphere by way of nozzles 70 and 69. Only upon termination of the pressure reduction in the air main, the piston element remains in abutment against valve seat 61 because of the pressure then remaining constant within line chamber 54 after the completion of a drawing-off cycle; service brake accelerator 52 ends its drawing-off cycles and remains at rest. During subsequent additional pressure reductions in the air main, e.g., for the purpose of attaining a higher braking level, the aforedescribed processes are repeated accordingly.

During the brake release, and towards the end of the release process, reference pressure chamber 55 is bled through duct 57 in the manner described above.

Figure 3:
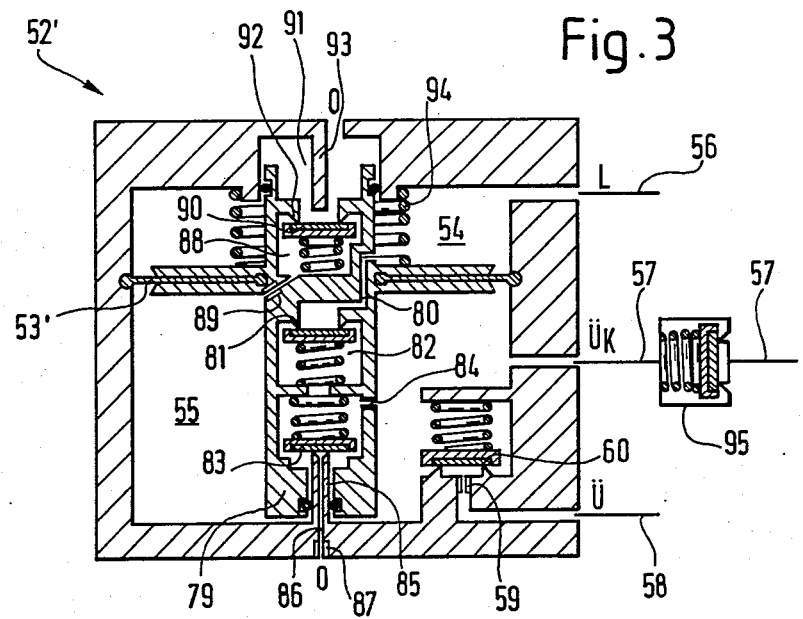

A further embodiment of the service brake accelerator according to the invention is shown in FIG. 3, showing the service brake accelerator 52'. According to FIG. 3, the piston element 53' of the otherwise familiar service brake accelerator 52', which is again connected to ducts 56, 57 and 58 and comprises a nozzle 59 and a check valve 60, is connected with a valve sleeve 79, the end of which located on the line chamber side is sealed and displaceably guided within the housing. From line chamber 54, a duct 80, passing through a spring loaded check valve 81, leads into first interior space 82 on the reference pressure chamber side of valve sleeve 79. The interior space 82 containing a spring-loaded valve seal 83 is connected with reference pressure chamber 55 by way of a nozzle 84. A valve tube 85, fixed to the housing, extends into valve sleeve 79 on its reference pressure chamber side in such a way that the valve seal 83 is seatable upon the end of valve tube 85. The bore hole 86 of valve tube 85 is also open towards atmosphere by way of a nozzle 87. Valve sleeve 79 is held displaceably and sealed on valve tube 85. A second interior space 88 on the line chamber side of valve sleeve 79 is in connection with reference pressure chamber 55 by way of a nozzle 89 and contains an additional, spring loaded valve seal 90 which can come to abut against a valve seat 92 surrounding a frontally arranged outlet 91 of valve sleeve 79. A stop 93, which is part of the housing, extends into outlet 91 and, in the inoperative position of service brake accelerator 52', terminates at a distance from valve seal 90. Line chamber 54 contains a spring 94 which acts upon piston element 53'.

In constrast to the aforedescribed embodiments, the service brake accelerator according to FIG. 3 has a check valve 95 arranged within duct 57, opening towards reference pressure chamber 55 in the direction of the flow. Check valve 95 has only a very minor retention effect, while check valve 81, being loaded by a stronger spring, may exert a much greater retention force.

When the brake system is ready for operation and under pressure, the service brake accelerator according to FIG. 3 assumes the position shown in the drawing, reference pressure chamber 55 also being charged with a certain pressure, supplied from line chamber 54 through check valve 81 and nozzle 84, said pressure being lower than the pressure within the air main by the retention pressure of the check valve 81; check valve 95 prevents the escape of the pressurized air from reference pressure chamber 55 through valve passage 34, 36 and duct 41, as well as through nozzle 42 towards atmosphere. Valve seal 83 seats upon valve tube 85, and valve seal 90 against valve seat 92. Valve sleeve 79, according to FIG. 3, is in its bottom position.

If the pressure within the air main is lowered for a brake application and duct 57 is pressurized with the prevailing air main pressure after the piston system of the triple pressure control valve has begun to lift and the intake valve 10, 43 has been opened, reference pressure chamber 55, by way of check valve 95, is also quickly brought up to the prevailing pressure level in the air main, and service brake accelerator 52' is activated.

During the continued pressure reduction within the air main, piston element 53' is affected mainly at its underside; it lifts together with valve sleeve 79, taking valve seal 83 along and lifting it from valve tube 85. This permits pressurized air from line chamber 54 to flow through duct 80, interior space 82, bore 86 and nozzle 87 to atmosphere. The retention effect of check valve 81 causes the pressure in interior space 82 always to be somewhat lower than the pressure within line chamber 54, so that a certain difference of pressure between reference pressure chamber 55 and interior space 82 is created, causing pressurized air from reference pressure chamber 55 to flow into interior space 82 by way of nozzle 84, to be discharged to atmosphere through valve pipe 85 and nozzle 87. This creates a certain pressure reduction within reference pressure chamber 55 which lags behind the pressure reduction in line chamber 54. Shortly after the response of the service brake accelerator 52', in triple pressure control valve 3, valve seal 34 seats upon valve seats 35, 36 which, however, has no effect on the service brake accelerator 52'. With an increased pressure reduction in line chamber 54, piston element 53' lifts further, valve seal 90 thereby is lifted from valve seat 92 by stop 93 and, consequently, an additional connection from reference pressure chamber 55 is opened towards atmosphere by way of nozzle 89, interior space 88 and outlet 91; the pressure in reference pressure chamber 55 is thereby lowered still further, so that it will be at least less than the pressure prevailing in the line chamber 54 at that moment, the piston element 53' descends somewhat, and valve seal 90 again rests against valve seat 92 while shutting off the additional bleeding of the reference pressure chamber through outlet 91. During a maintained continuing pressure reduction in line chamber 54, these processes are repeated, so that the service brake accelerator 52' begins to oscillate, whereby, depending on the lift amplitude of the piston element 53', valve seal 83 also may temporarily be seated onto valve tube 85 for brief repeated interruptions of the described bleeding process of line chamber 54 and reference pressure chamber 55 through bore hole 86. After completion of the pressure reduction in line chamber 54, the service brake accelerator 52' following a corresponding pressure reduction in reference pressure chamber 55, returns to the position shown; the retention of the bleeding of line chamber 54 by means of check valve 81 assures a pressure reduction in reference pressure chamber 55 through nozzle 84 in such a manner that there results at least a pressure balance between line chamber 54 and reference pressure chamber 55 while spring 94 may push piston element 53' into the illustrated position.

During the release operation of the brake system, the service brake accelerator 52' remains in the position shown. However, lifting of valve seal 43 from valve seats 53 and 36 within the triple pressure control valve 3, check valve 95 makes bleeding of reference pressure chamber 55 impossible, with a pressure level remaining within the latter, slowly rising by way of nozzle 84 until it reaches a level which is below the line pressure by the retention value of the check valve 81. Nozzle 84 in this case is so narrow that, considering the retention effect of check valve 81, no air consumption from the air main interferes with the release process.

As in the above described embodiments, duct 58 and check valve 60 assure that, during braking operations, the pressure within reference pressure chamber 55 can never essentially or over longer periods fall below the obtaining pressure in the air main.

In contrast to what is shown in FIG. 3, nozzle 84 may be supplied with a check valve with a low retention effect, for instance in the form of a rubber diaphragm which has a shut-off effect in the direction of flow from interior space 82 to reference pressure chamber 55. Check valve 95 in duct 57 can then be omitted. In this particular embodiment as described with respect to FIG. 2, reference pressure chamber 55 in the release condition of the service brake accelerator modified according to FIG. 3 is kept ventilated and is filled with pressurized air through ducts 57 and 58 only at the start of the braking operation. In this particular embodiment, therefore, any consumption of pressurized air for reference pressure chamber 55 is avoided during or shortly after release operations, while the rest of the function of the service brake accelerator is retained.

In a variation of the embodiment according to FIG. 3, it is possible to close nozzle 84 in service brake accelerator 52' and thus to exclude bleeding of reference pressure chamber 55 through interior space 82 and bore 86. In this particular embodiment, check valves 81, 95 can be omitted; during the response phase, piston element 53' and valve sleeve 79 are pulsating with strokes which are sufficient for a lifting of valve seal 90 from valve seat 92 on the one hand, and for the seating of valve seal 83 onto valve tube 85, on the other hand.

The accelerator with a service brake accelerator of any chosen design, e.g., with the service brake accelerator according to FIGS. 2 or 3, may be combined with control valves of a design which is different from that shown in FIG. 1, provided these control valves have only one pick-up accelerator with one transfer chamber. Control valves of this kind may be very similar in design to triple pressure control valve 3, but without discharge valve 48, 49 and bleeding duct 50', but they also may be quite differently built, e.g., as direct-release twin pressure control valves.

What is claimed is:

1. Accelerator for control valves, particularly triple pressure control valves (3) in pneumatic brake systems of rail vehicles, having a pick-up accelerator (30) reducing the air main pressure at the start of a braking operation, with a transfer chamber (40); an intake valve (10, 43) arranged between the air main (1) and said transfer chamber (40), said intake valve opening at the start of the braking operation; a discharge valve (48, 49) open only in the release position of said control valve (3), said discharge valve leading from said transfer chamber (40) to atmosphere; the accelerator also having a shut-off valve (34, 35 36) between said transfer chamber (40) and said intake valve (10, 43), said shut-off valve closing subsequent to the response of said control valve (3) and the filling of said transfer chamber (40); a piston element (53, 53') acted upon by the pressure in a line chamber (54) connected with said air main (1) against the pressure in a reference pressure chamber (55); service brake accelerator coupled with said piston element (53, 53') which is directly or indirectly open to the atmosphere while being preponderantly acted upon by the reference pressure; said reference pressure chamber (55) being connected to said transfer chamber (40), said transfer chamber (40) having a bleeder nozzle which is not open at all times.

2. Accelerator as claimed in claim 1, wherein said shut-off valve comprises a double valve (34, 35, 36) opening in the same direction and nearly simultaneously, having valve passages (34, 36, and 34, 35, respectively) separated from each other in the closed position, by a duct section (37) located between said shut-off valve and said intake valve (10, 43) toward the atmosphere or said transfer chamber (40), respectively.

3. Accelerator as claimed in claim 2, wherein said shut-off valve has a valve seal (34) interacting with two concentric valve seats (35, 36), the space (38) surrounding the larger valve seat (36), the annular space (39) between the two valve seats (35 and 36) and the internal space enclosed by the smaller valve seat (35) in any desired combination being connected with said duct section (37), atmosphere, or, respectively, said transfer chamber (40).

4. Accelerator as claimed in any one of claims 1 to 3, comprising a duct section (37) located between said shut-off valve (double valve 34, 35, 36) and said intake valve (10, 43) by way of a series arrangement of a nozzle (59) and a check valve (60) connected with said reference pressure chamber (55).

5. Accelerator as in any one of claims 1 to 3, wherein said piston element (53) when preponderantly charged with the reference pressure opens a first valve (valve seat 61), said first valve being arranged within a connection from said reference pressure chamber (55), said connection having a nozzle (63) and leading to a first space (64) which is closed by a valve seat (65), and which, dependent on the stroke, and lagging, opens a second valve (73, 74) arranged in a connection (71) from a space containing the main air pressure, said connection (71) having an additional nozzle (70) and leading to a seond space (68), said second space (68) bordering said first space (64) while being separated by the valve seat (65), said valve seat (65) being coverable by a spring-loaded diaphragm (67), said second space (68) being connected with atmosphere by way of a third nozzle (69).

6. Accelerator as claimed in any one of claims 1 to 3, wherein said piston element (53') is connected with a valve sleeve (79), said valve sleeve (79) at its reference pressure chamber side having a first interior space (82) connected with said line chamber (54), said interior space (82) containing a valve seal (83) which forms part of a first valve (83, 85) and which is biased by spring means against a valve tube (85) extending into said first interior space (82) through a frontal opening of said control sleeve (79), being sealed and being displaceable, its bore (86) being connected with atmosphere by way of a first nozzle (87), said valve sleeve (79) on its line chamber side having a second interior space (88) connected with said reference pressure chamber (55) by way of a second nozzle (89), said space containing an additional valve seal (90) belonging to a second valve (90, 92) which can be resiliently seated onto a valve seat (92) surrounding a frontal outlet (91) of said control sleeve (79), wherein said valve seat, in its rest position, faces, at some distance, a stop (93) extending through said outlet (91) into the housing, to which it is fixed, so that said second valve opens in sequence after said first valve.

7. Accelerator as claimed in claim 6, comprising a spring-loaded check valve (81) within the connection (duct 80) from said line chamber (54) to said first interior space (82), a nozzle bore (84) leading from said first interior space (82) to said reference pressure chamber (55).

8. Accelerator as claimed in claim 7, comprising a check valve (95) in the connection (duct 57) from said transfer chamber (40) to said reference pressure chamber (55).

* * * * *